US011838263B1

(12) United States Patent
Joshi et al.

(10) Patent No.: US 11,838,263 B1
(45) Date of Patent: Dec. 5, 2023

(54) STATELESS ADDRESS AUTO-CONFIGURATION WITH MULTIPLE SUBNET SUPPORT METHOD AND APPARATUS

(71) Applicant: VERIZON PATENT AND LICENSING INC., Basking Ridge, NJ (US)

(72) Inventors: Kiritkumar Joshi, Cupertino, CA (US); Jose M. Verger, Alamo, CA (US); Samirkumar Patel, Middlesex, CA (US); Michael Talbert, Nazareth, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/966,922

(22) Filed: Oct. 17, 2022

(51) Int. Cl.
*G06F 15/16* (2006.01)
*H04L 61/5007* (2022.01)
*H04L 101/659* (2022.01)
*H04L 101/668* (2022.01)

(52) U.S. Cl.
CPC .... *H04L 61/5007* (2022.05); *H04L 2101/659* (2022.05); *H04L 2101/668* (2022.05)

(58) Field of Classification Search
CPC .................................................. H04L 61/5007
See application file for complete search history.

(56) References Cited

U.S. PATENT DOCUMENTS

| | | | | |
|---|---|---|---|---|
| 6,532,217 B1 * | 3/2003 | Alkhatib | .............. | H04L 69/166 370/254 |
| 6,697,360 B1 * | 2/2004 | Gai | ..................... | H04L 61/5014 370/389 |
| 9,270,761 B1 * | 2/2016 | Logue | ................. | H04L 65/1069 |
| 10,931,628 B2 * | 2/2021 | Nayak | ................. | H04L 61/5092 |
| 2006/0291426 A1 * | 12/2006 | Park | ........................ | H04W 8/26 370/349 |
| 2009/0097453 A1 * | 4/2009 | Weniger | ................ | H04W 8/087 370/331 |
| 2013/0067043 A1 * | 3/2013 | Gaitonde | ................ | H04L 61/35 709/220 |
| 2013/0279367 A1 * | 10/2013 | Sarikaya | ................. | H04L 45/72 370/467 |
| 2018/0351911 A1 * | 12/2018 | Gavrilovic | ......... | H04L 67/1063 |
| 2020/0120725 A1 * | 4/2020 | Mildh | ................... | H04W 76/12 |

FOREIGN PATENT DOCUMENTS

| | | | |
|---|---|---|---|
| CN | 101557349 A | * 10/2009 | |
| CN | 114024888 A | * 2/2022 | ............. H04L 45/04 |

* cited by examiner

*Primary Examiner* — Christopher B Robinson

(57) ABSTRACT

Techniques for stateless address auto-configuration with support for multiple, different subnets are disclosed. In one embodiment, a method is disclosed comprising receiving, by a network device, a router solicitation (RS) message from a network node, generating, by the network device, a router advertisement (RA) message for use in determining the network node's network address, the RA message including a network address prefix and subnetting information, the subnetting information comprising a subnet address, a subnet address length and a subnet option type, and transmitting, by the network device, the RA message to the network node.

20 Claims, 11 Drawing Sheets

```
+ Frame 2206 (70 bytes on wire, 70 bytes captured)
+ Ethernet II, Src: 192.168.1.100 (00:11:d8:39:29:2b)   ─ 110
  Destination: IPv6-Neighbor-Discovery_00:00:02
  Source: 192.168.1.100                          (00:yy:d8:39:yy:yy)
  Type: IPv6 (0x86dd)                            └─ 120
+ Internet Protocol Version 6
  Version: 6
  Traffic class: 0x00
  Flowlabel: 0x00000
  Payload length: 16
  Next header: ICMPv6 (0x3a)
  Hop limit: 255                                       ─ 124
  Source address:           fe80::02yy:d8ff:fe39:yyyy
  Destination address: ff02::2 ─ 202
+ Internet Control Message Protocol v6  ─ 204
  Type: 133 (Router Solicitation)
  Code: 0
  checksum: 0x7842 (correct)
  ICMPv6 options
    Type: 1 (Source link-layer address)
    Length: 8 bytes (1)                            ─ 120
    Link-layer address:       00:yy:d8:39:yy:yy
```

ICMP v6 Options:

- Type: 3
- Length:
- IPv6 Prefix Length: 64
- Flags
- IPv6 Prefix: xxxx:4840:ffff:c012

ICMP v6 Options:

- Type: 6
- Length:
- IPv6 Prefix Length: 64
- Subnet Length: 16
- Flags
- IPv6 Prefix: xxxx:4840:ffff:c012
- Subnet Prefix: 0a

ICMP v6 Options:

- Type: 7
- Length:
- IPv6 Prefix Length: 64
- Subnet Length: 8
- Flags
- IPv6 Prefix: xxxx:4840:ffff:c012
- Subnet Prefix: 0a

Figure 6

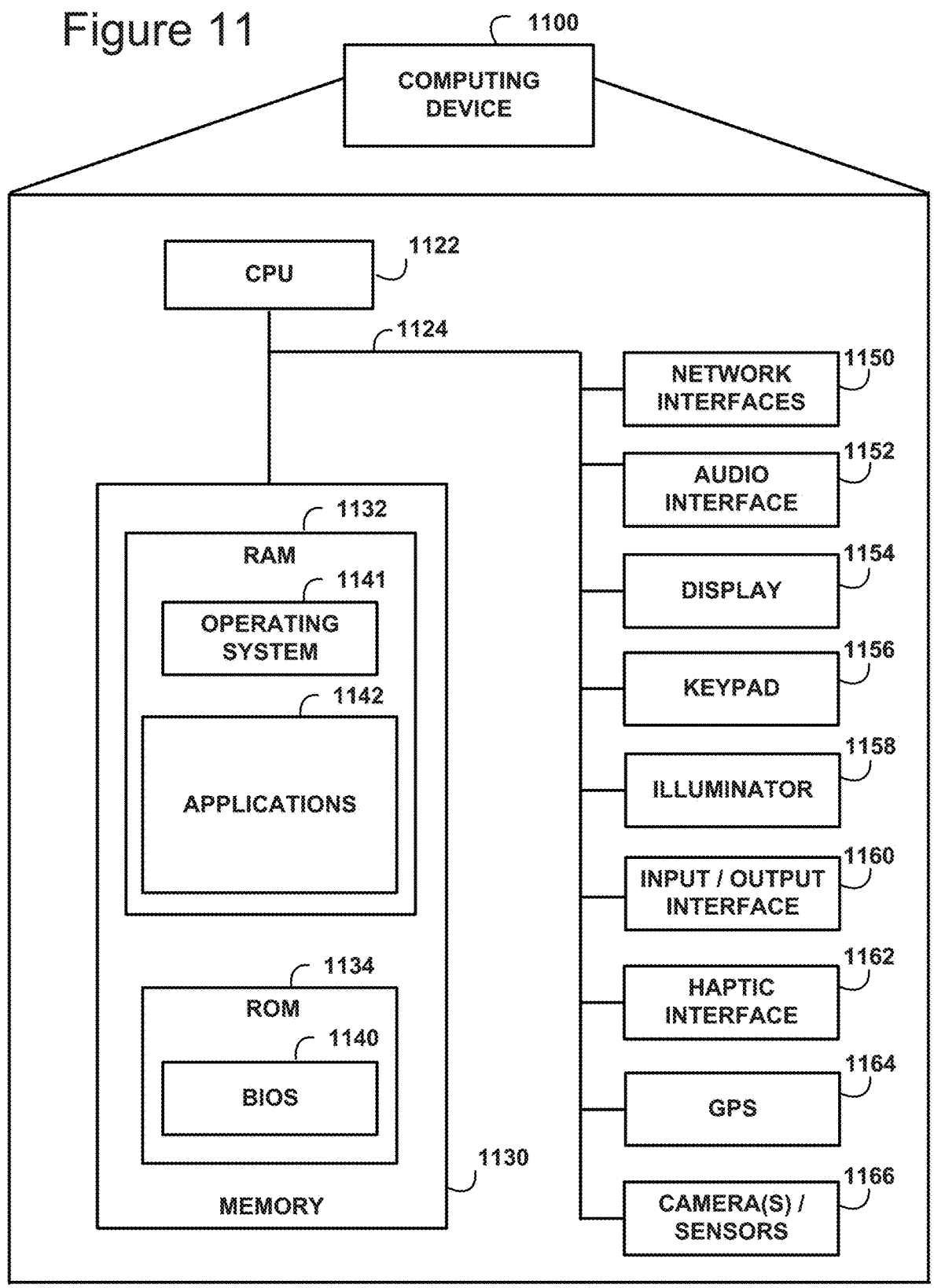

STATELESS ADDRESS AUTO-CONFIGURATION WITH MULTIPLE SUBNET SUPPORT METHOD AND APPARATUS

BACKGROUND INFORMATION

A node, such as a host device, connected to an IPv6- (Internet Protocol version 6) enabled network can auto-configure itself with a link-local address that the node can use to communicate at Layer 3 with other IPv6 nodes in a local segment. The node can use SLAAC (Stateless Address Autoconfiguration) to autoconfigure a unique IPv6 address without any device keeping track of which address is assigned to which node. The resulting IPv6 address of the host device is able to support a single subnet.

BRIEF DESCRIPTION OF THE DRAWINGS

FIG. 2 provides an example of information included in a router solicitation message in accordance with embodiments of the present disclosure;

FIG. 3 provides an example of information included in router advertisement message in accordance with one or more embodiments of the present disclosure;

FIG. 6 provides examples of information included with ICMPv6 option types 3, 6 and 7 in accordance with one or more embodiments of the present disclosure;

FIG. 11 provides a block diagram illustrating a computing device showing an example of client or server device used in accordance with one or more embodiments of the present disclosure.

DETAILED DESCRIPTION OF EXAMPLE EMBODIMENTS

Techniques for stateless address auto-configuration with support for multiple, different subnets are disclosed. Disclosed embodiments provide subnet option types for use in communicating subnet information in a router advertisement message to auto-configure a host's IPv6 address with a subnet address using SLAAC. Multiple, different subnet addresses can be used with router advertisement messages directed to host devices. Each subnet address can correspond to a network segment, or VLAN (virtual local area network). A router (or other device capable of communicating router advertisement messages) can use one of the subnet option types to communicate a subnet address to a host configured to recognize the subnet option type. The host can incorporate the subnet address into the host's IPv6 network address in accordance with the option type used by the router.

Figure 1:
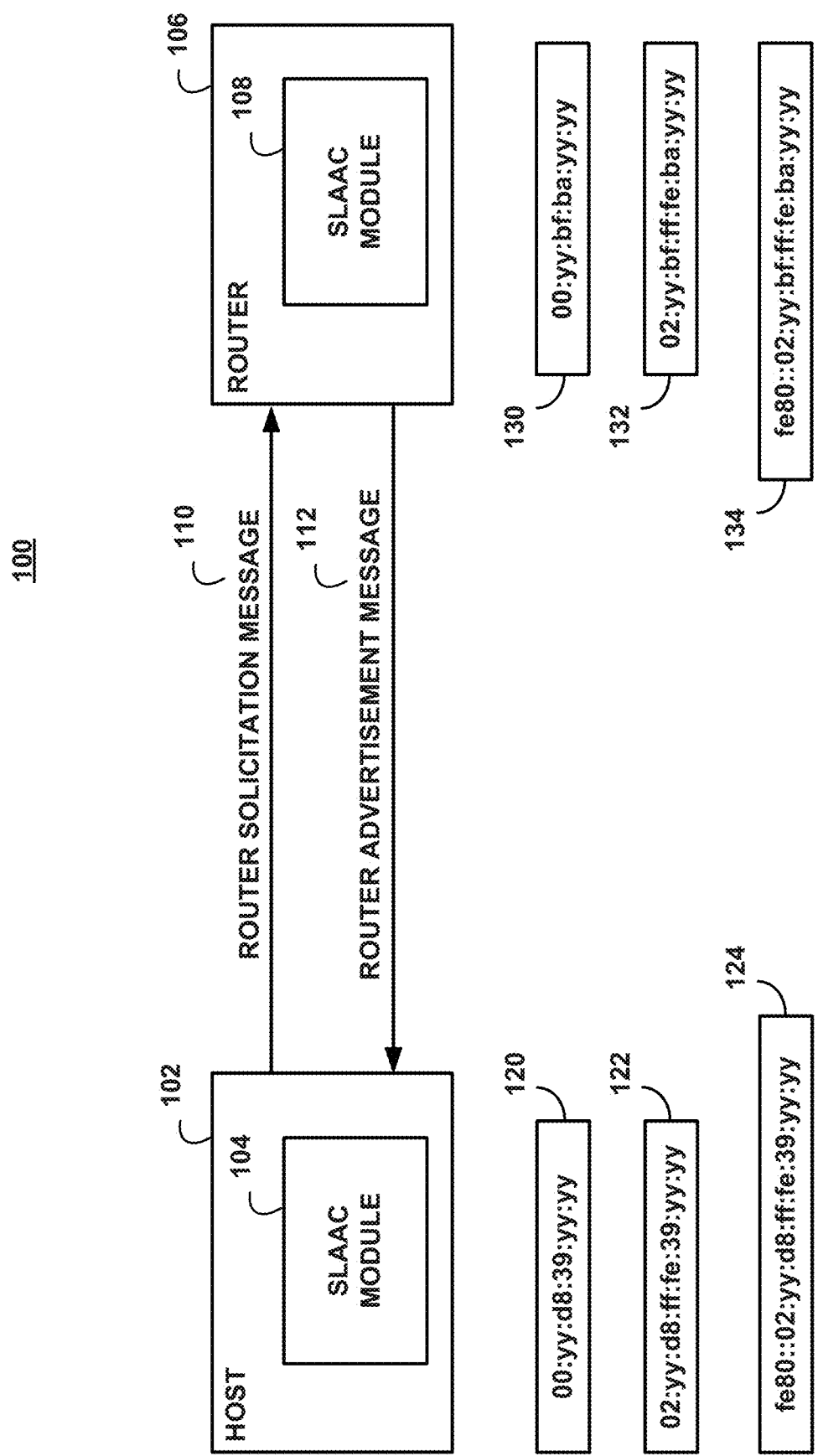
FIG. 1 illustrates exemplary components that support multiple subnets using SLAAC in accordance with one or more embodiments of the present disclosure.

FIG. 1 illustrates exemplary components that support multiple subnets using SLAAC in accordance with one or more embodiments of the present disclosure. A host device 102 comprises a SLAAC module configured to receive a router advertisement (RA) message 112 including a subnet option type with subnetting information comprising a subnet address in connection with auto-configuration of the IPv6 address of host 102. Router 106 can be configured to receive router solicitation (RS) message 110 from host 102 and to provide RA message 112 in response. In accordance with one or more embodiments, the option type included in the RA message 112 can be used to specify a subnet address, subnet address length and a location of the subnet address in the host's IPv6 address.

In accordance with one or more embodiments of the present disclosure, SLAAC module 104 can be configured to generate RS message 110. By way of a non-limiting example, SLAAC module 104 can be implemented by a network interface component of host 102. SLAAC module 104 can be configured to use a media access control (MAC) address 120 to generate a device address 122.

In FIGS. 1-8, "x" and "y" can be used in place of a hexadecimal digit, or value, in an address (e.g., a MAC address, device address, source address, etc.).

By way of a non-limiting example, device address 122 can be an IPv6 EUI-64 (Extended Unique Identifier-64) ID 64-bits in length. By way of a further non-limiting example, device address 122 can be generated by flipping the value of the seventh bit of MAC address 120 and inserting the hexadecimal values "fffe" (as hexadecimal padding digits) between the sixth and seventh hexadecimal digits of MAC address 120 (e.g., between hexadecimal values "8" and "3" of MAC address 120), as shown in example 100 depicted in FIG. 1.

SLAAC module 104 can be further configured to generate (or otherwise obtain) a source address 124 (of host 102) comprising device address 122 and a prefix (such as "FE80::") appended thereto. In accordance with one or more embodiments of the present disclosure, SLAAC module 108 of router can be configured to generate (or obtain) source address 134 in a similar manner using MAC address 130 of router 106 to generate device address 132. The resulting source address 134 of router 106 includes device address 132 with the prefix (such as "FE80::") appended thereto.

FIG. 2 provides an example of information included in RS message 110 in accordance with embodiments of the present disclosure. As shown in example 200, RS message 110 can include MAC address 120 and the source address 124 of host 102. As discussed herein, the source address 124 (of host 102) includes the device address 122 of host 102. In accordance with ICMPv6 (Internet Control Message Protocol version 6), RS message 110 includes a message type 204 with a corresponding value, "133", indicating that the RS message 110 is a router solicitation message. In addition, RS message 110 can include a destination address 202. In example 200, destination address 202 has a value of "ff02:: 2", which designates an "all-routers" multicast destination address to direct RS message 110 to multiple routers, including router 106.

Figure 3:
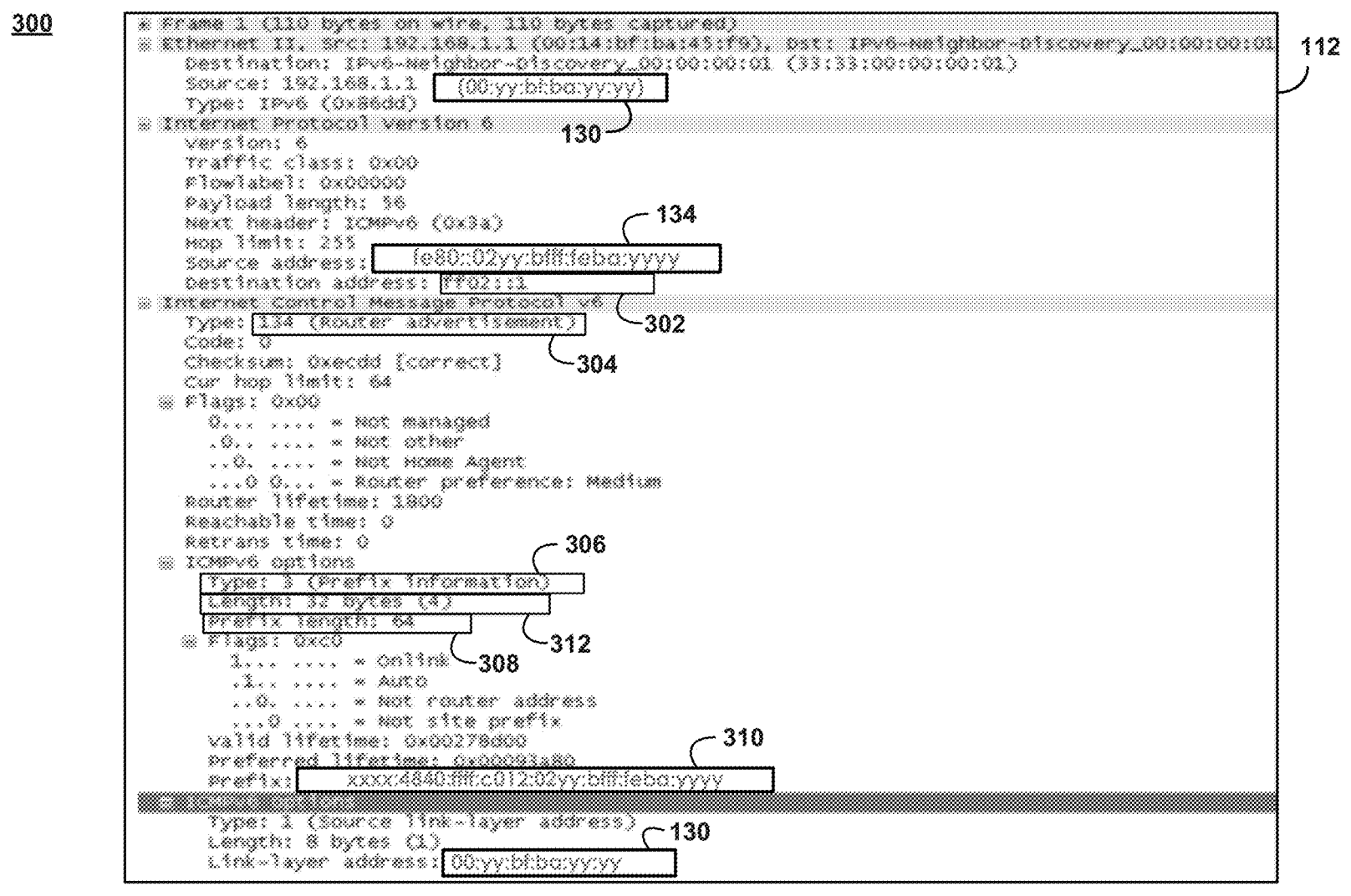

FIG. 3 provides an example of information included in RA message 112 in accordance with one or more embodiments of the present disclosure. As shown in example 300, RA message 112 can include MAC (or link-layer) address 130 and source address 134 of router 106. As discussed herein, the source address 134 (of router 106) includes the device address 132 of router 106. In accordance with ICMPv6, RA message 112 includes a message type 304 with a corresponding value of "134" indicating that RA message 112 is a router advertisement message. In addition, in example 300, RA message 112 includes a destination address 302. In example 300, destination address 302 with a value of "ff02::1" designates an "all-nodes" multicast destination address to direct RA message 112 to multiple nodes, such as host 102.

As shown in example 300, RA message 112 can include an IPv6 address prefix 310 of router 106. In addition, in accordance with ICMPv6, RA message 112 includes ICMPv6 options, which can be used for optional information included in RA message 112. ICMPv6 currently defines five options: source link layer address (type 1), target link layer address (type 2), prefix information (type 3), redirected header (type 4) and maximum transmission unit (MTU) (type 5).

None of the known and currently defined option types provide a mechanism for communicating multiple, different subnets. As is discussed in more detail herein, embodiments of the present disclosure define two new option types referred to herein as option type 6 and option type 7, which can be used to specify subnet information.

With reference to FIG. 2, RS message 110 uses option type 1 to specify link layer (or MAC) address 120 for host 102. Referring to FIG. 3, RA message 112 also uses option type 1 to specify link-layer (or MAC) address 130 for router 106.

In addition, as shown in example 300 of FIG. 3, RA message 112 uses option type 3 (see element 306 in example 300) to specify prefix information, such as an IPv6 address prefix 310 and prefix length 308 indicating the length (e.g., 64 bits) of IPv6 address prefix 310. In addition, length 312 can be used to specify the length of the option section (e.g., 32 bytes). Length 312 can be used to determine where the option section ends in RA message 112.

IPv6 address prefix 310 can be used with device address 122/132 to form an IPv6 address. Host 102 (e.g., SLAAC module 104) can determine its IPv6 address using IPv6 address prefix 310 (from RA message 112) and its device address 122. Router 106 can determine its IPv6 address in a similar manner using IPv6 address prefix 310 and device address 132.

Figure 4:
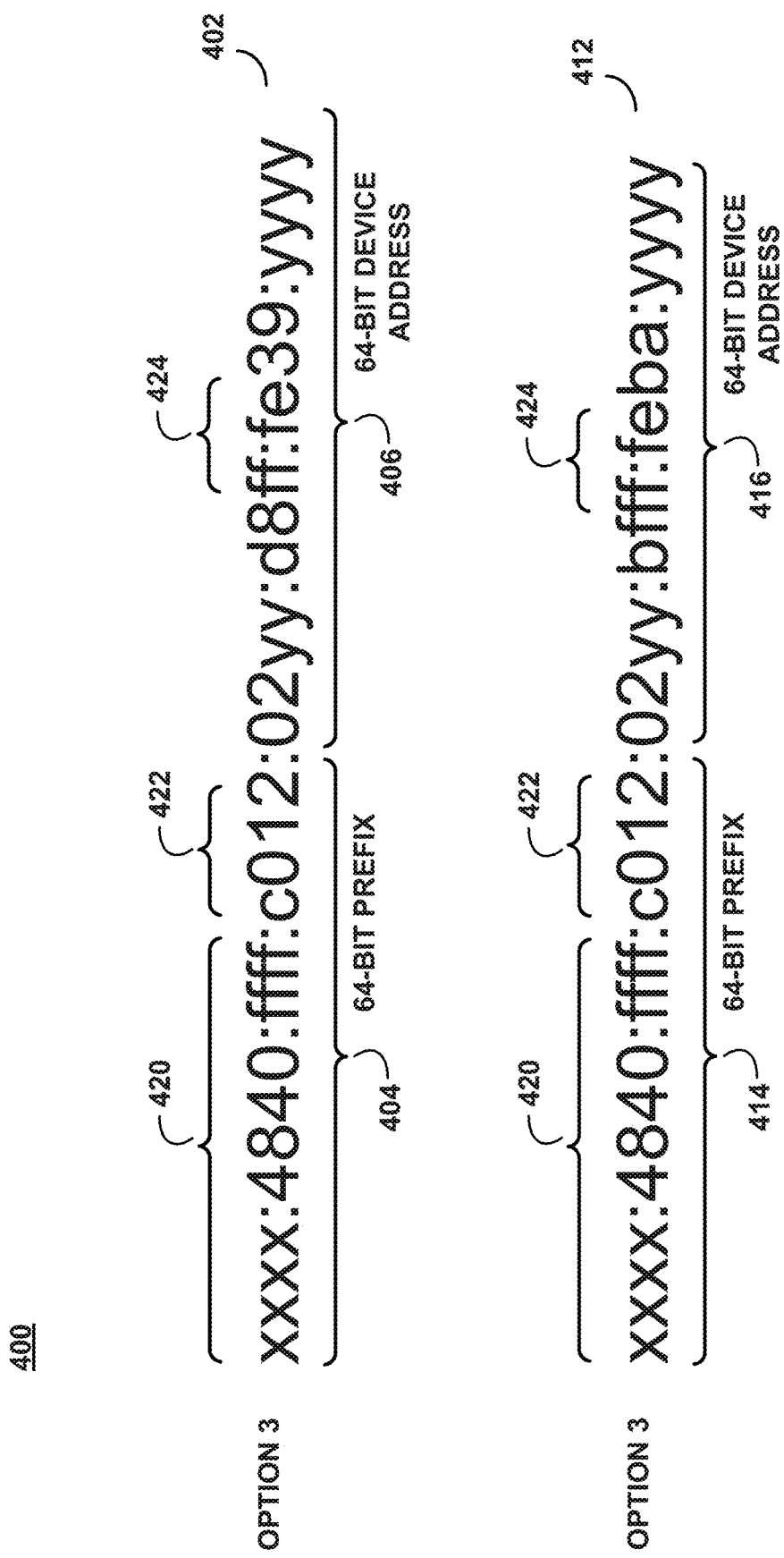
FIG. 4 provides examples of IPv6 addresses in accordance with one or more embodiments of the present disclosure.

FIG. 4 provides examples of IPv6 addresses in accordance with one or more embodiments of the present disclosure. Example 400 includes IPv6 addresses 402 and 412 corresponding to host 102 and router 106 (respectively). Both IPv6 addresses 402 and 412 have the same format—i.e., a 64-bit IPv6 address and a 64-bit device address.

In example 400, IPv6 address 402 of host 102 includes device address 406 corresponding to device address 122. IPv6 address 412 of router 106 includes network prefix 414 and device address 416 corresponding to device address 132.

As shown on example 400 of FIG. 4, prefixes 404 and 414 of IPv6 addresses 402 and 412 corresponding to host 102 and router 106 (respectively) use the same IPv6 address prefix, which corresponds to IPv6 address prefix 310 (specified in example 300 using option type 3). IPv6 address prefix 310 comprises a global network address portion 420 and a subnet address portion 422. As shown in example 400, the IPv6 address 402 for host 102 has the same subnet address as the IPv6 address 412 of router 106. Option type 3 of ICMPv6 (used in generating IPv6 addresses 402 and 412) only permits one subnet e.g., the subnet corresponding to subnet address "C012."

By way of a non-limiting example, using ICMPv6 option type 3, router 106 uses the same subnet address (e.g., subnet address 422) in any RS message 112 that it transmits to hosts (e.g., hosts on a LAN (local area network) serviced by router 106). Each one of the hosts that receives RS message 112 (sent by router 106) uses IPv6 address prefix 310, which includes IPv6 subnet address 422 prefix 310.

Embodiments of the present disclosure enable multiple subnets, where router 106 is able to designate multiple, different subnet addresses in an RA message. By way of a non-limiting example, an RA message can designate the subnet address for router 106 as well as a subnet address for a host 102.

Subnets provide a mechanism to logically subdivide a physical network into segments (e.g., logical segments, virtual networks or virtual local area networks (VLANs)). Subnetting can be used to group hosts based on any of a number of factors, such as and without limitation, enterprise departments, device types, a shared QoS (quality of service) policy, security considerations, network performance considerations, an inter-device communications policy/control, etc.

In accordance with one or more embodiments of the present disclosure, router 106 can be configured to use two new ICMPv6 option types, referred to herein as option types 6 and 7, enabling multiple different subnets with IPv6 addresses. The option-type numbering (e.g., 6 and 7) used herein is for illustrative purposes. It should be apparent that any number scheme can be used with embodiments of the present disclosure.

By way of a non-limiting example, the subnetting scheme can be determined by a network administrator and can provide information indicating host-to-subnet mappings. Router 106 can transmit subnetting information to hosts using RA messages using option type 6 or option type 7. Router 106 can also be configured to use option type 3, as is discussed in more detail below.

Figure 5:
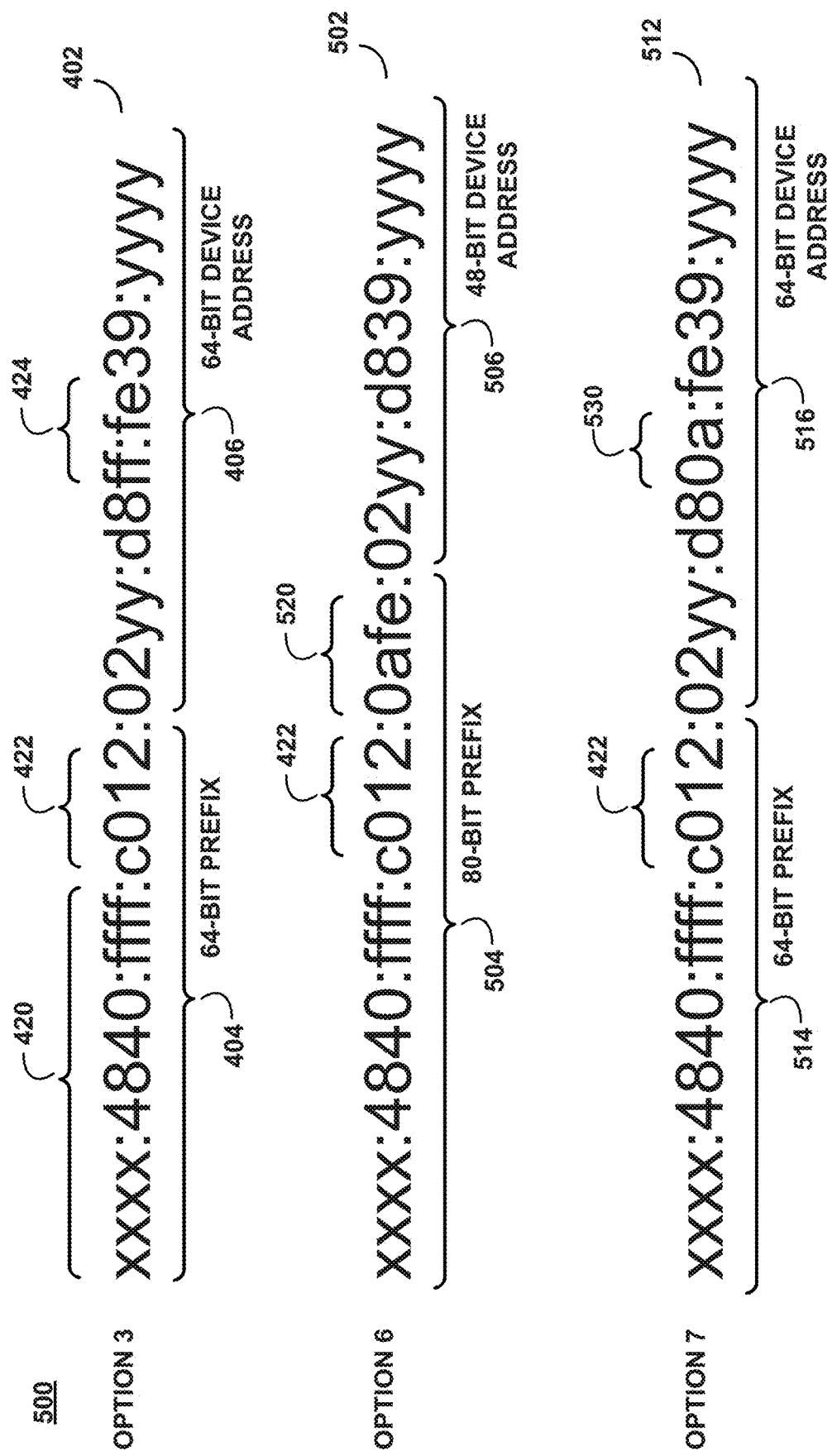
FIG. 5 provides examples of IPv6 addresses using the new, alternate subnetting option types in accordance with one or more embodiments of the present disclosure.

FIG. 5 provides examples of IPv6 addresses using the new, alternate subnetting option types in accordance with one or more embodiments of the present disclosure. Example 500 includes IPv6 address 402 of host 102, which (as discussed in connection with FIG. 4) includes device address 406 and address prefix 404 which uses the same subnet address 422 as router 106, per option type 3 of ICMP v6.

In accordance with one or more such embodiments, subnetting options, e.g., option types 6 and 7, can be used to add a subnet address (for a host 102) to an IPv6 address while retaining the same overall IPv6 address length (e.g., 128 bits) used with option type 3.

As shown in connection with IPv6 address 502 of example 500, in accordance with one or more embodiments, option type 6 can be used to include subnet address 520 in prefix 504 thereby increasing the length of prefix 504 (e.g., from 64 bits to 80 bits) to accommodate subnet address 520 (e.g., 16 bits in length). To compensate for the additional length of prefix 504 (to include subnet address 520 in prefix 504), device address 506 can be modified to remove hexadecimal padding digits 424 (included in IPv6 addresses 402 and 412). By removing hexadecimal padding digits 424, the length of device address 506 is reduced from 64 bits to 48 bits, and the overall length of IPv6 address 502 is 128 bits. As can be seen in example 500, IPv6 address 502 includes subnet address 422 as well as subnet address 520.

In accordance with one or more embodiments, the subnet address portion of an IPv6 address is 16-bits in length and can accommodate a subnet address with an actual length of 16 bits or 8 bits. A 16-bit subnet address provides for approximately 65 k (e.g. 65,536) subnets. An 8-bit subnet address provides 256 subnets, which may be sufficient in some embodiments for a given subnet.

In accordance with one or more embodiments, with option 6, where the actual length of a subnet address is 8 bits, 2 hexadecimal padding digits (e.g., either "ff" or "fe") can be used as padding to retain an 80-bit prefix length and a 128-bit address length. In example 500, subnet address 520 comprises an 8-bit subnet address ("0a") and hexadecimal values "fe" are used as hexadecimal padding digits.

It should be apparent that other subnetting options can be used with embodiments of the present disclosure. By way of a non-limiting example, in accordance with one or more embodiments, option type 6 (or another option type, such as an option designated type 8, not shown) can be used to accommodate subnet addresses 8 bits in length without using hexadecimal padding digits. By way of a non-limiting example, in accordance with embodiments of the present disclosure, the addition of an 8-bit subnet address to an IPv6 address prefix can yield a 72-bit IPv6 address prefix (without any padding digits), where a 56-bit device address can be used resulting in an IPv6 address 128 bits in length. By way of a further non-limiting example, the 72-bit address prefix can be generated by extending the IPv6 address prefix (e.g., IPv6 address prefix 310) to include an 8-bit subnet address, and the 56-bit device address can be generated by removing two hexadecimal padding digits from a source address (e.g., device address 122,132). In accordance with one or more embodiments, this subnetting option can be implemented using option type 6. Alternatively, this subnetting option can be implemented using another option type (e.g., option type 8).

In accordance with one or more embodiments, option 7 can be used to incorporate a subnet address 530 in a device address, such as device address 516. In example 500, subnet address 530 is added to a device address (e.g., device address 122) and a corresponding number (e.g., two) of the hexadecimal padding digits 424 can be removed from the source address. The resulting length (e.g., 64 bits) of device address 516 is the same as that used in IPv6 addresses 402 and 412. The prefix 514 can be the same as prefix 310 used in IPv6 addresses 402 and 412. As can be seen in example 500, IPv6 address 512 includes subnet address 422 as well as subnet address 530.

In accordance with one or more embodiments, with option type 7 (or another option type, e.g., an option designated option type 9, not shown) can be used with a subnet address 16-bits in length to incorporate a subnet address 16 bits in length in a device address of an IPv6 address. In such a case, the four hexadecimal padding digits 424 can be removed from the source address to yield a device address 64-bits in length and including a 16-bit subnet address.

FIG. 6 provides examples of information included with ICMPv6 option types 3, 6 and 7 in accordance with one or more embodiments of the present disclosure. As discussed herein, in accordance with embodiments of the present disclosure, option types 3, 6 and 7 can be used in an RA message, such as RA message 112.

As illustrated in example 600, option types 6 and 7 can share some of the same fields as option 3, such as type, length, IPv6 prefix length, flags, and IPv6 prefix fields. In addition, option types 6 and 7 can include subnetting information, such as subnet length and subnet prefix information. It should be apparent that the field names and values used in example 600, to convey subnetting information are for illustrative purposes only.

In accordance with one or more embodiments, with option type 6, the subnet prefix field value (e.g., "0a") can be used with the IPv6 Prefix field value (e.g., "xxxx:4840:ffff:c012") to specify an IPv6 prefix for an IPv5 address. Referring to FIG. 5, IPv6 address 502 uses an 80-bit prefix including network prefix 404 (which includes subnet address 422) and subnet address 520 followed by device address 506. Device address 506 (of IPv6 address 502) can be generated by removing hexadecimal padding digits 424, as discussed.

As discussed herein, the subnet address length used with option type 6 can vary from 8-bit to 16-bit lengths. By way of a non-limiting example, in a case that the subnet length is set to 8 bits, two hexadecimal padding digits (e.g., "fe") can be used to pad a device address.

In accordance with one or more embodiments, with option type 7, at least two of hexadecimal padding digits 424 (depending on the length of the subnet address) can be removed from the device address. By way of a non-limiting example, an 8-bit subnet address (e.g., "0a) can replace two of the hexadecimal padding digits 424, whereas a 16-bit subset address (e.g., "000a") replaces the four hexadecimal padding digits 424. Referring to FIG. 5, IPv6 address 512 uses a 64-bit prefix 514 corresponding to prefix 310 used in IPv6 address 402 (generated in accordance with option type 3) and a 64-bit device address including subnet address 530 in place of the "ff" hexadecimal portion of hexadecimal padding digits 424.

Figure 7:
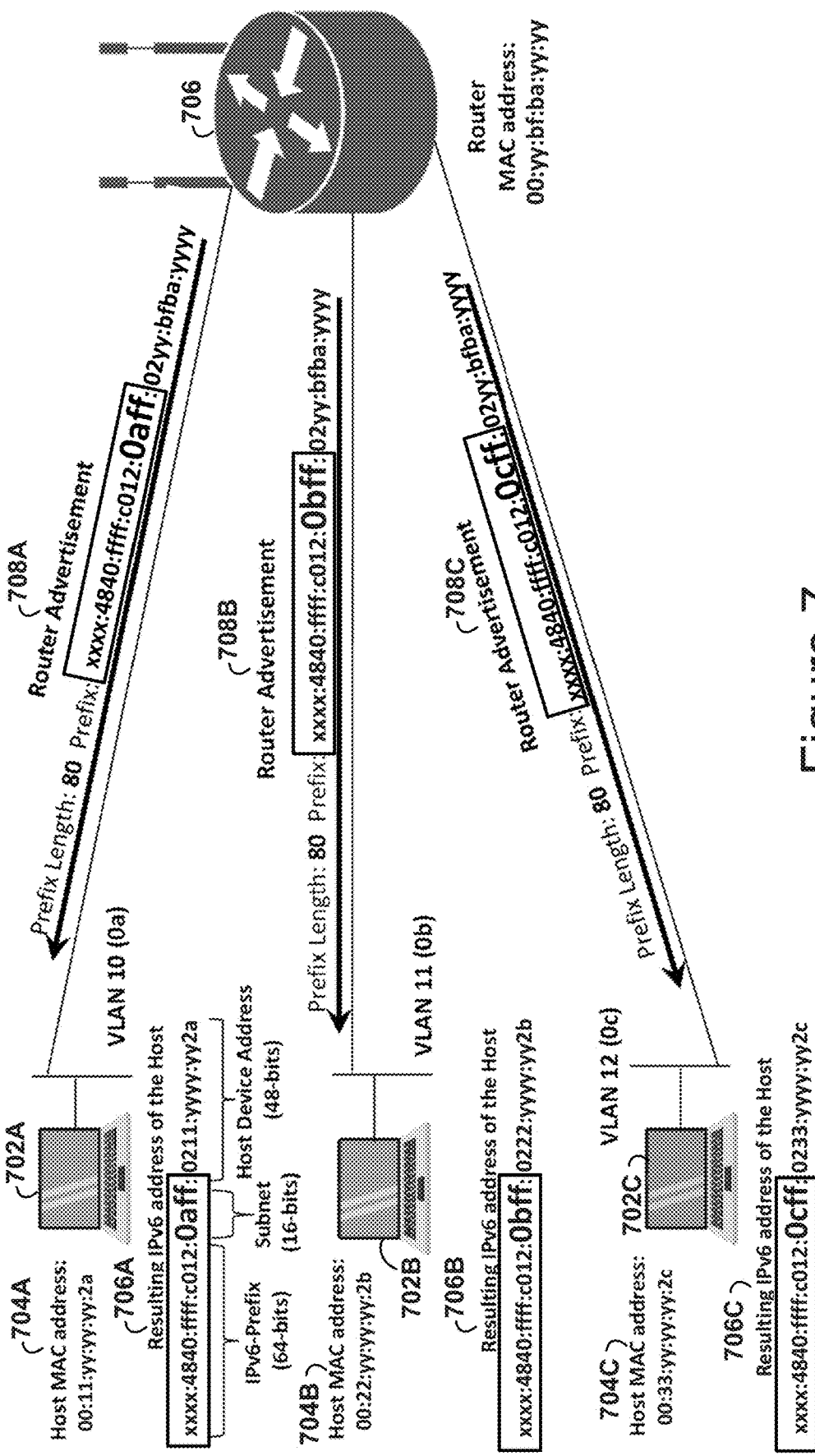
FIG. 7 provides an example of multiple subnet-assignments using option type 6 in accordance with one or more embodiments of the present disclosure.

FIG. 7 provides an example of multiple subnet-assignments using option type 6 in accordance with one or more embodiments of the present disclosure. In example 700, router 706 can use option type 6 with RA messages 708A, 708B and 708C (collectively referred to herein as RA messages 708) to specify different subnet addresses for hosts 702A, 702B and 702C (collectively referred to herein as hosts 702). Hosts 702A, 702B and 702C have corresponding MAC addresses 704A, 704B and 704C (respectively). As shown in example 700, hosts 702A, 702B and 702C can be assigned to different VLANs (Virtual Local Area Networks) using different subnet addresses (e.g., subnet addresses 10, 11 and 12).

In example 700, hosts 702A, 702B and 702C each has an IPv6 address 706A, 706B and 706C (respectively) including a prefix with the same initial 64-bits but different subnet values in accordance with (respectively) RA messages 708A, 708B and 708C.

Figure 8:
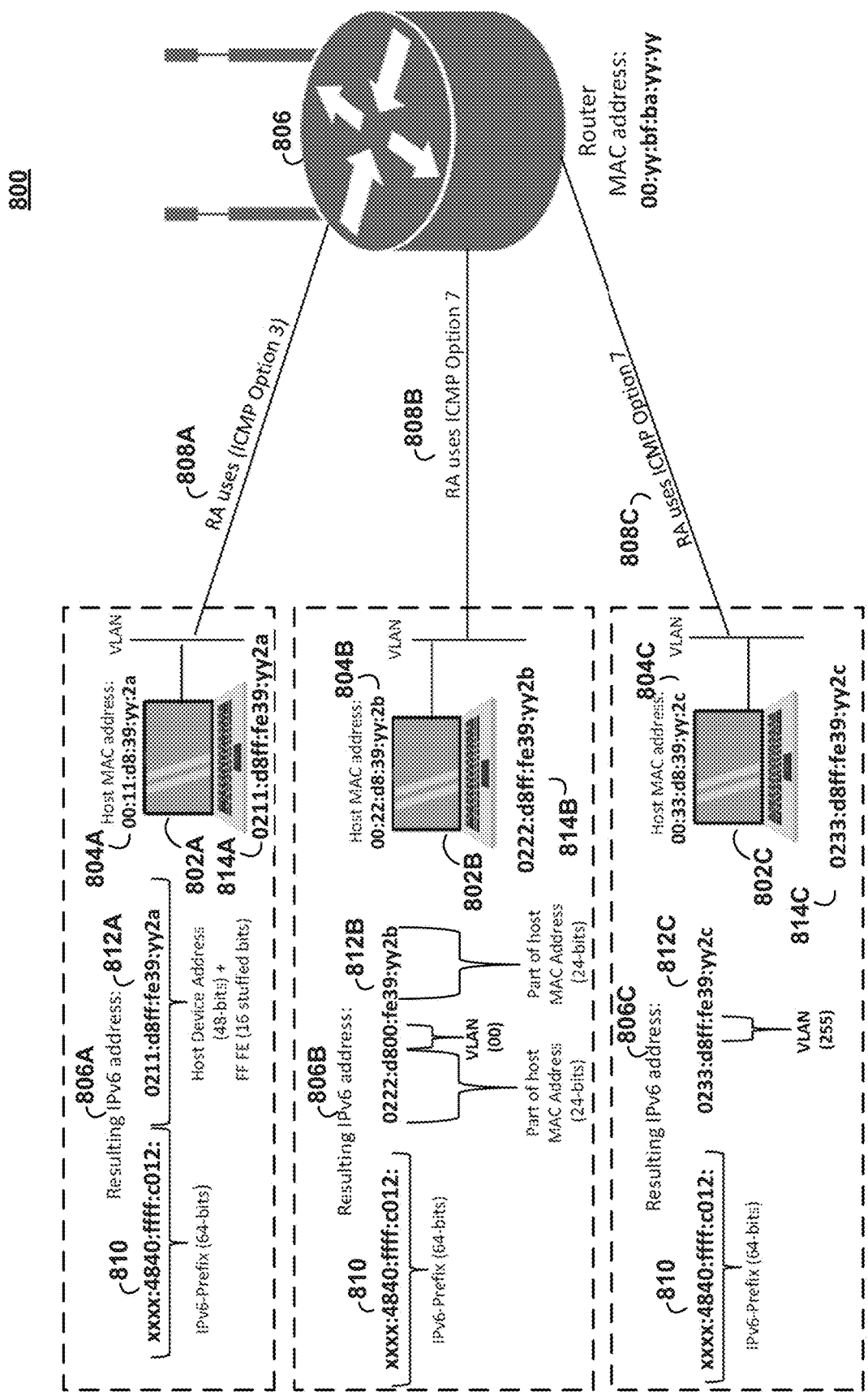
FIG. 8 provides an example illustrating option type 7 used in combination with option type 3 in accordance with one or more embodiments of the present disclosure.

FIG. 8 provides an example illustrating option type 7 used in combination with option type 3 in accordance with one or more embodiments of the present disclosure. By way of a non-limiting example, in example 800, router 806 can be configured to use either option type 3 or option type 7 in an RA message (e.g., RA message 112). In accordance with one or more embodiments, router 806 can use option type 7 for subnetting in a case that a host is configured to use option type 7, or option type 3 in a case that a host is not configured to use option type 7.

In accordance with one or more embodiments, router 806 can determine that host 802A is not configured to use option type 7, and can transmit RA message 808A, which uses option type 3, to host 802A. Router 806 can transmit RA messages 808B and 808C to hosts 802B and 802C (respectively), which are configured to use option type 7.

In accordance with one or more embodiments, host 802A can receive RA message 808A which specifies prefix information using option type 3. IPv6 address 806A, for host 802A, includes prefix 810 as a network address and device address 812A. Device address 812A corresponds to device address 814A, which can be generated using MAC address 804A of host 802A. As discussed herein, device address 812A,814A can be an IPv6 EUI-64 ID generated by flipping the value of the seventh bit of MAC address 804A and inserting the hexadecimal values "ff" and "fe" (as hexadecimal padding digits) between the sixth and seventh hexadecimal digits of MAC address 804A.

Host 802B can receive RA message 808B which specifies prefix and subnet information using option type 7. With reference to FIG. 6, the subnet information can comprise a subnet length (e.g., 8 bits) and a subnet value (e.g., "00"). IPv6 address 806B includes prefix 810 and device address 812B. Device address 812B can be generated, by host 802B, using device address 814B (generated using MAC address 804B of host 802B), where subnet value (e.g., "00") is used in place of the "ff" hexadecimal padding digits used in device address 814B.

Similarly, host 802C can receive RA message 808C which specifies prefix and subnet information using option type 7. IPv6 address 806C includes prefix 810 and device address 812C. Device address 812C can be generated, by host 802C, using device address 814C (generated using MAC address 804C of host 802C), where subnet value (e.g., "255") is designated using hexadecimal values "ff", which are considered to be a subnet address rather than hexadecimal padding digits.

Although not shown in example 800, router 806 can be further configured to use option type 6 as well as option types 3 and 7. Configured in this manner, router 806 can transmit an RA message that uses option type 6 to a host configured to use option type 6.

Figure 9:
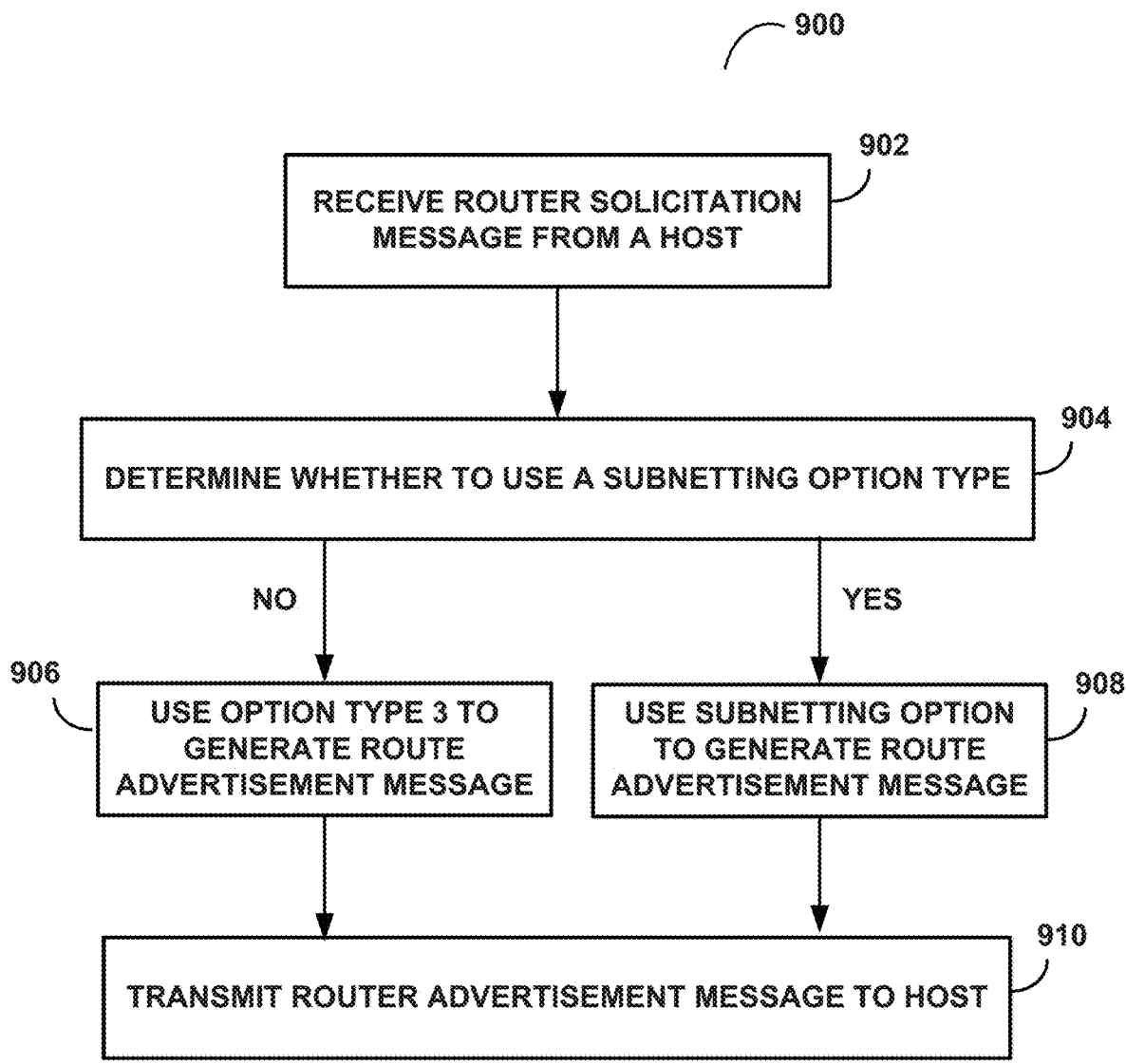
FIG. 9 provides a router advertisement process flow in accordance with one or more embodiments of the present disclosure.

FIG. 9 provides a router advertisement process flow in accordance with one or more embodiments of the present disclosure. In accordance with one or more embodiments, process flow 900 can be performed by SLAAC module 108 of router 106. At step 902, a router solicitation message is received from a host. By way of a non-limiting example, router 106 can receive RS message 110 from host 102 via an "all-routers" destination address.

At step 904, a determination is made whether to use a subnetting option. By way of a non-limiting example, router 106 can make a determination whether to use option type 6 or 7 (or another subnetting option type).

By way of a further non-limiting example, the determination can be based on whether or not host 102 is configured to recognize a subnetting option type. As yet another example, the determination can be based on whether host 102 is to be part of a subnet other than the subnet designated in the IPv6 address of router 106. By way of a non-limiting example, the determination can be based on a network topology designated by a network administrator. As discussed herein, option type 3 can be used for one subnet—i.e., the same subnet used in the router's IPv6 address. Additionally, option type 3 can be used where host 102 is not configured to recognize a subnetting option. Where the determination is made to use subnetting, a subnetting option (e.g., one of option types 6 and 7) can be used to specify multiple, different subnets.

In accordance with one or more embodiments, step 906 or 908 is performed based on the determination made at step 904.

At step 906, option type 3 is used to generate a router advertisement message. Step 906 is performed in a case that the determination made at step 904 indicates that a single subnet is to be used rather than a subnetting option. Referring again to example 600 of FIG. 6, router 106 can generate RA message 112 which includes information corresponding to that shown in connection with ICMPv6 option type 3 (designating IPv6 address prefix information).

At step 908, a subnetting option is used to generate a router advertisement message. Step 908 is performed in a case that the determination made at step 904 indicates that a subnetting option allowing multiple, different subnet addresses is to be used rather than the single subnet permitted with option type 3.

Referring again to example 600 of FIG. 6, router 106 can generate RA message 112 which includes information corresponding to that shown in connection with ICMPv6 option type 6 or option type 7. As shown in example 600, option types 6 and 7 include IPv6 address prefix information as well as subnet information (e.g., subnet prefix and length). The subnetting option type used by router 106 can be based on a predetermined configuration determined by a network administrator.

At step 910, the router advertisement message is transmitted to the host. By way of a non-limiting example, router 106 can transmit RA message 112 to host 102 via an "all-nodes" destination address.

Figure 10:
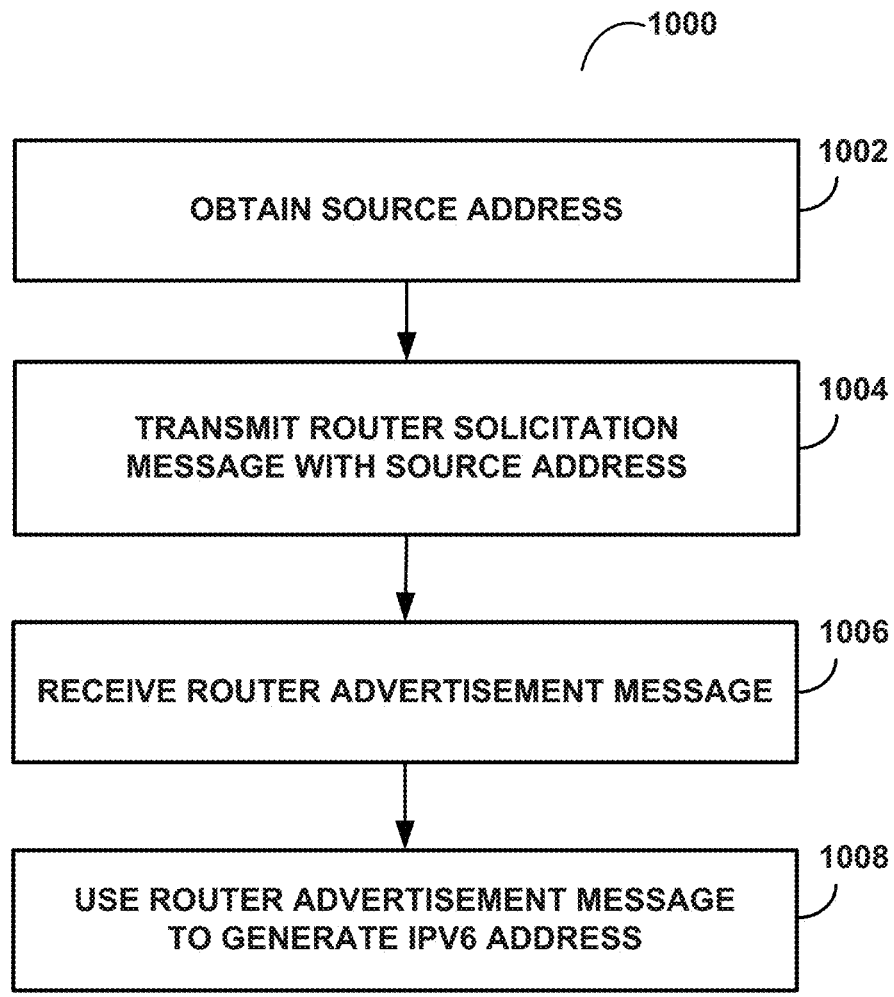
FIG. 10 provides a network address generation process flow in accordance with one or more embodiments of the present disclosure.

FIG. 10 provides a network address generation process flow in accordance with one or more embodiments of the present disclosure. In accordance with one or more embodiments, process flow 1000 can be performed by SLAAC module 104 of host 102.

At step 1002, a source address is obtained. By way of a non-limiting example, source address can be source address 124 obtained by host 102. By way of a further non-limiting example, source address 124 of host 102 can be generated by appending a prefix (e.g., "FE::80") to device address 122 (of host 102), which can be an IPv6 EUI-64 ID 64-bits in length generated from MAC address 120 (of host 102).

At step 1004, a router solicitation message is transmitted with the device address. By way of a non-limiting example, host 102 can transmit RS message 110 (which includes source address 124 of host 102) to router 106 using an "all routers" destination address.

At step 1006, a router advertisement message is received. By way of a non-limiting example, host 102 can receive RA message 112 from router 106 via an "all-nodes" destination address.

At step 1008, the router advertisement message can be used to generate an IPv6 address. By way of a non-limiting example, host 102 can use RA message 112 to generate an IPv6 address based on the option type (and corresponding information) specified in RA message 112. By way of some non-limiting examples, with reference to FIGS. 5 and 6, host 102 can generate IPv6 address 402 (in example 500 of FIG. 5) using the option type 3 information (in example 600 of FIG. 6). By way of another non-limiting example, host 102 can generate IPv6 address 502 in example 500 (of FIG. 5) using the option type 6 information in example 600 (of FIG. 6). By way of a further non-limiting example, host 102 can generate IPv6 address 512 in example 500 (of FIG. 5) using the option type 7 information in example 600 (of FIG. 6).

In accordance with one or more embodiments, host 102 and router 106 can be a computing device such as that illustrated in FIG. 11. FIG. 11 is a block diagram illustrating a computing device showing an example of a client or server device which can be used in the various embodiments of the disclosure.

The computing device 1100 may include more or fewer components than those shown in FIG. 11, depending on the deployment or usage of the device 1100. For example, a server computing device, such as a rack-mounted server, may not include audio interfaces 1152, displays 1154, keypads 1156, illuminators 1158, haptic interfaces 1162, GPS receivers 1164, or cameras/sensors 1166. Some devices may include additional components not shown, such as graphics processing unit (GPU) devices, cryptographic co-processors, artificial intelligence (AI) accelerators, or other peripheral devices.

As shown in FIG. 11, the device 1100 includes a central processing unit (CPU) 1122 in communication with a mass memory 1130 via a bus 1124. The computing device 1100 also includes one or more network interfaces 1150, an audio interface 1152, a display 1154, a keypad 1156, an illuminator 1158, an input/output interface 1160, a haptic interface 1162, an optional global positioning systems (GPS) receiver 1164 and a camera(s) or other optical, thermal, or electromagnetic sensors 1166. Device 1100 can include one camera/sensor 1166 or a plurality of cameras/sensors 1166. The positioning of the camera(s)/sensor(s) 1166 on the device 1100 can change per device 1100 model, per device 1100 capabilities, and the like, or some combination thereof.

In some embodiments, the CPU 1122 may comprise a general-purpose CPU. The CPU 1122 may comprise a single-core or multiple-core CPU. The CPU 1122 may comprise a system-on-a-chip (SoC) or a similar embedded system. In some embodiments, a GPU may be used in place of, or in combination with, a CPU 1122. Mass memory 1130 may comprise a dynamic random-access memory (DRAM) device, a static random-access memory device (SRAM), or a Flash (e.g., NAND Flash) memory device. In some embodiments, mass memory 1130 may comprise a combination of such memory types. In one embodiment, the bus 1124 may comprise a Peripheral Component Interconnect Express (PCIe) bus. In some embodiments, the bus 1124 may comprise multiple busses instead of a single bus.

Mass memory 1130 illustrates another example of computer storage media for the storage of information such as computer-readable instructions, data structures, program modules, or other data. Mass memory 1130 stores a basic input/output system ("BIOS") 1140 (e.g., as part of ROM 1134) for controlling the low-level operation of the computing device 1100. The mass memory also stores an operating system 1141 for controlling the operation of the computing device 1100.

Applications 1142 may include computer-executable instructions which, when executed by the computing device 1100, perform any of the methods (or portions of the methods) described previously in the description of the preceding Figures. In some embodiments, the software or programs implementing the method embodiments can be read from a hard disk drive (not illustrated) and temporarily stored in RAM 1132 by CPU 1122. CPU 1122 may then read the software or data from RAM 1132, process them, and store them to RAM 1132 again.

The computing device 1100 may optionally communicate with a base station (not shown) or directly with another computing device. Network interface 1150 is sometimes known as a transceiver, transceiving device, or network interface card (NIC).

The audio interface 1152 produces and receives audio signals such as the sound of a human voice. For example, the audio interface 1152 may be coupled to a speaker and microphone (not shown) to enable telecommunication with others or generate an audio acknowledgment for some action. Display 1154 may be a liquid crystal display (LCD), gas plasma, light-emitting diode (LED), or any other type of display used with a computing device. Display 1154 may also include a touch-sensitive screen arranged to receive input from an object such as a stylus or a digit from a human hand.

Keypad 1156 may comprise any input device arranged to receive input from a user. Illuminator 1158 may provide a status indication or provide light.

The computing device 1100 also comprises an input/output interface 1160 for communicating with external devices, using communication technologies, such as USB, infrared, Bluetooth™, or the like. The haptic interface 1162 provides tactile feedback to a user of the client device.

The optional GPS transceiver 1164 can determine the physical coordinates of the computing device 1100 on the surface of the Earth, which typically outputs a location as latitude and longitude values. GPS transceiver 1164 can also employ other geo-positioning mechanisms, including, but not limited to, triangulation, assisted GPS (AGPS), E-OTD, CI, SAI, ETA, BSS, or the like, to further determine the physical location of the computing device 1100 on the surface of the Earth. In one embodiment, however, the computing device 1100 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user," "subscriber," "consumer," or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
receiving, by a network device, a router solicitation (RS) message from a network node;
generating, by the network device, a router advertisement (RA) message for use in determining the network node's network address, the RA message including a network address prefix and subnetting information, the subnetting information comprising a subnet address, a subnet address length and a subnet option type; and
transmitting, by the network device, the RA message to the network node.

2. The method of claim 1, wherein the subnet address is different than a subnet address corresponding to the network device specified in the network address prefix.

3. The method of claim 1, wherein the node's network address comprises the network address prefix and a device address, the subnet option type indicating a manner in which the subnet address is incorporated in the network node's network address.

4. The method of claim 3, wherein the option type indicates that the subnet address is to be incorporated into the network node's network address by appending the subnet address to the network address prefix and removing a number of padding digits from the device address of the network node, the number of padding digits to be removed being equal to the subnet address length.

5. The method of claim 4, wherein an actual length of the subnet address is less than the subnet address length specified in the subnetting information, the option type further indicating that a second number of padding digits be added to the network address prefix, the second number being equal to a difference between the subnet address length and the actual length of the subnet address.

6. The method of claim 3, wherein the option type indicates that the subnet address is to be incorporated into the network node's device address by replacing a number of padding digits in the device address with the subnet address, the number of padding digits to be removed being equal to the subnet address length.

7. The method of claim 3, wherein the device address of the network node is based on a link-layer address that is based on a media access control (MAC) address of the network node.

8. The method of claim 1, further comprising:
making, by the network device, a determination that the network node is configured to use the subnetting information prior to generating the RA message including the subnetting information.

9. The method of claim 1, further comprising:
receiving, by the network device, a second RS message from a second network node;
making, by the network device, a determination that the second network node is unable to use subnetting information;
generating, by the network device, a second RA message without subnetting information based on the determination; and
transmitting, by the network device, the second RA message to the second network node.

10. A non-transitory computer-readable storage medium tangibly encoded with computer-executable instructions that when executed by a processor associated with a computing device perform a method comprising:
receiving, by a network computing device, a router solicitation (RS) message from a network node;
generating, by the network computing device, a router advertisement (RA) message for use in determining the network node's network address, the RA message including a network address prefix and subnetting information, the subnetting information comprising a subnet address, a subnet address length and a subnet option type; and
transmitting, by the network computing device, the RA message to the network node.

11. The non-transitory computer-readable storage medium of claim 10, wherein the subnet address is different than a subnet address corresponding to the network computing device specified in the network address prefix.

12. The non-transitory computer-readable storage medium of claim 10, wherein the node's network address comprises the network address prefix and a device address, the subnet option type indicating a manner in which the subnet address is incorporated in the network node's network address.

13. The non-transitory computer-readable storage medium of claim 12, wherein the option type indicates that the subnet address is to be incorporated into the network node's network address by appending the subnet address to the network address prefix and removing a number of padding digits from the device address of the network node, the number of padding digits to be removed being equal to the subnet address length.

14. The non-transitory computer-readable storage medium of claim 13, wherein an actual length of the subnet address is less than the subnet address length specified in the subnetting information, the option type further indicating that a second number of padding digits be added to the network address prefix, the second number being equal to a difference between the subnet address length and the actual length of the subnet address.

15. The non-transitory computer-readable storage medium of claim 12, wherein the option type indicates that the subnet address is to be incorporated into the network node's device address by replacing a number of padding digits in the device address with the subnet address, the number of padding digits to be removed being equal to the subnet address length.

16. The non-transitory computer-readable storage medium of claim 10, wherein the device address of the network node is based on a link-layer address that is based on a media access control (MAC) address of the network node.

17. The non-transitory computer-readable storage medium of claim 10, further comprising:
making, by the network computing device, a determination that the network node is configured to use the subnetting information prior to generating the RA message including the subnetting information.

18. The non-transitory computer-readable storage medium of claim 10, further comprising:
receiving, by the network computing device, a second RS message from a second network node;
making, by the network computing device, a determination that the second network node is unable to use subnetting information;
generating, by the network computing device, a second RA message without subnetting information based on the determination; and
transmitting, by the network computing device, the second RA message to the second network node.

19. A device comprising:
a processor, configured to:
receive a router solicitation (RS) message from a network node;
generate a router advertisement (RA) message for use in determining the network node's network address, the RA message including a network address prefix and subnetting information, the subnetting information comprising a subnet address, a subnet address length and a subnet option type; and
transmit the RA message to the network node.

20. The device of claim 19, the processor further configured to:
 make a determination that the network node is configured to use the subnetting information prior to generating the RA message including the subnetting information.

\* \* \* \* \*